US009698616B2

(12) United States Patent
Mohagheghi et al.

(10) Patent No.: US 9,698,616 B2
(45) Date of Patent: Jul. 4, 2017

(54) SYSTEMS AND METHODS FOR RESTORING SERVICE WITHIN ELECTRICAL POWER SYSTEMS

(75) Inventors: Salman Mohagheghi, Centennial, CO (US); James Stoupis, Raleigh, NC (US)

(73) Assignee: ABB Research Ltd., Zurich (CH)

( * ) Notice: Subject to any disclaimer, the term of this patent is extended or adjusted under 35 U.S.C. 154(b) by 355 days.

(21) Appl. No.: 14/354,267

(22) PCT Filed: Sep. 13, 2012

(86) PCT No.: PCT/US2012/055118

§ 371 (c)(1), (2), (4) Date: Apr. 30, 2014

(87) PCT Pub. No.: WO2013/066501

PCT Pub. Date: May 10, 2013

(65) Prior Publication Data

US 2014/0285154 A1 Sep. 25, 2014

Related U.S. Application Data

(60) Provisional application No. 61/553,398, filed on Oct. 31, 2011.

(51) Int. Cl.

*G05D 3/12* (2006.01)
*G01R 31/36* (2006.01)

(Continued)

(52) U.S. Cl.

CPC .......... *H02J 7/0063* (2013.01); *B60L 3/0069* (2013.01); *B60L 3/04* (2013.01); *B60L 11/005* (2013.01);

(Continued)

(58) Field of Classification Search

CPC .... H02J 4/00; H02J 3/381; H02J 3/006; H02J 7/0063; H02J 3/0006; H02J 13/0006;

(Continued)

(56) References Cited

U.S. PATENT DOCUMENTS

| | | | |
|---|---|---|---|
| 5,642,270 | A | 6/1997 | Green |
| 5,815,824 | A | 9/1998 | Saga |

(Continued)

FOREIGN PATENT DOCUMENTS

| | | | |
|---|---|---|---|
| WO | 2010042550 | A3 | 4/2010 |
| WO | 2010096502 | A1 | 8/2010 |

(Continued)

OTHER PUBLICATIONS

Mekic et al., "Distributed Automation for Back-Feed Network Power Restoration", IEEE, 2009, 7 pages.*

(Continued)

*Primary Examiner* — Robert Fennema
*Assistant Examiner* — Thomas Stevens
(74) *Attorney, Agent, or Firm* — Taft Stettinius & Hollister LLP

(57) ABSTRACT

Systems and methods for restoring service within electrical power systems are disclosed. The methods may include identifying a restoration path for an outage area within a power system, selecting a mobile energy resource connection site that is electrically connected to the restoration path and/or the outage area, sending power injection requests to a plurality of mobile energy resources, at least some of which may be proximate the connection site, receiving power injection acceptances from participating ones of the plurality of mobile energy resources, and implementing the restoration path. The systems may include a processor and a computer readable storage medium having a plurality of machine-readable instructions embodied thereon and con- (Continued)

S1 R1 (NC) R2 (NC) R3 (NO) R4 (NC) R5 (NC) S2
14 18 20 22 24 26 16
12 28 30 32 34
10 36 38
40 42 44 figured for execution by the processor to carry out the method.

17 Claims, 7 Drawing Sheets

(51) Int. Cl.

| | |
|---|---|
| ***H02J 7/00*** | (2006.01) |
| ***B60L 11/18*** | (2006.01) |
| ***H02J 3/00*** | (2006.01) |
| ***H02J 3/38*** | (2006.01) |
| ***H02J 13/00*** | (2006.01) |
| ***H02J 4/00*** | (2006.01) |
| ***B60L 3/00*** | (2006.01) |
| ***B60L 3/04*** | (2006.01) |
| ***B60L 11/00*** | (2006.01) |
| ***B60L 11/16*** | (2006.01) |
| *H01L 35/30* | (2006.01) |
| *H02J 3/32* | (2006.01) |

(52) U.S. Cl.

CPC ........... *B60L 11/16* (2013.01); *B60L 11/1816* (2013.01); *B60L 11/1824* (2013.01); *B60L 11/1842* (2013.01); *B60L 11/1846* (2013.01); *B60L 11/1861* (2013.01); *B60L 11/1864* (2013.01); *B60L 11/1887* (2013.01); *H02J 3/006* (2013.01); *H02J 3/381* (2013.01); *H02J 4/00* (2013.01); *H02J 13/0006* (2013.01); *B60L 2210/30* (2013.01); *B60L 2210/40* (2013.01); *B60L 2240/72* (2013.01); *B60L 2240/80* (2013.01); *B60L 2260/58* (2013.01); *H02J 3/32* (2013.01); *H02J 2003/001* (2013.01); *Y02E 60/721* (2013.01); *Y02E 60/722* (2013.01); *Y02T 10/7022* (2013.01); *Y02T 10/7044* (2013.01); *Y02T 10/7061* (2013.01); *Y02T 10/7072* (2013.01); *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y02T 90/34* (2013.01); *Y04S 10/126* (2013.01); *Y04S 10/14* (2013.01); *Y04S 30/14* (2013.01); *Y10T 307/344* (2015.04); *Y10T 307/62* (2015.04)

(58) Field of Classification Search

CPC ...... B60L 11/1842; B60L 3/04; B60L 3/0069; B60L 11/005; B60L 11/1887; B60L 11/1864; B60L 11/1861; B60L 11/1816; B60L 11/16; B60L 11/1824; B60L 11/1846

USPC ..................... 136/205; 700/286, 291; 702/63

See application file for complete search history.

(56) References Cited

U.S. PATENT DOCUMENTS

| | | | | |
|---|---|---|---|---|
| 6,621,179 | B1 | 9/2003 | Howard | |
| 6,697,951 | B1 | 2/2004 | Sinha | |
| 6,907,321 | B2 | 6/2005 | Kearney | |
| 7,149,605 | B2 | 12/2006 | Chassin | |
| 7,164,211 | B1 | 1/2007 | Tafoya | |
| 7,478,070 | B2 | 1/2009 | Fukui | |
| 7,692,404 | B2 | 4/2010 | Harris | |
| 7,698,078 | B2 | 4/2010 | Kelty | |
| 7,705,487 | B2 | 4/2010 | Chaiquin | |
| 7,747,739 | B2 | 6/2010 | Bridge | |
| 7,844,370 | B2 | 11/2010 | Pollack | |
| 7,949,435 | B2 | 5/2011 | Pollack | |
| 7,986,126 | B1 * | 7/2011 | Bucci | B60L 3/12 320/109 |
| 8,019,483 | B2 * | 9/2011 | Keefe | B60L 11/1842 700/286 |
| 8,335,595 | B2 * | 12/2012 | Tolnar | H02J 3/14 700/286 |
| 2001/0025209 | A1 | 9/2001 | Fukui | |
| 2004/0158360 | A1 | 8/2004 | Garland | |
| 2005/0027636 | A1 | 2/2005 | Gilbert | |
| 2007/0282495 | A1 | 12/2007 | Kempton | |
| 2008/0039979 | A1 | 2/2008 | Bridges | |
| 2008/0039980 | A1 | 2/2008 | Pollack | |
| 2008/0040223 | A1 | 2/2008 | Bridges | |
| 2008/0040263 | A1 | 2/2008 | Pollack | |
| 2008/0040295 | A1 | 2/2008 | Kaplan | |
| 2008/0040479 | A1 | 2/2008 | Bridge | |
| 2008/0052145 | A1 * | 2/2008 | Kaplan | G06Q 10/0631 705/7.12 |
| 2009/0043520 | A1 | 2/2009 | Pollack | |
| 2009/0048716 | A1 | 2/2009 | Marhoefer | |
| 2009/0063680 | A1 | 3/2009 | Bridges | |
| 2009/0066287 | A1 | 3/2009 | Pollack | |
| 2009/0103341 | A1 | 4/2009 | Lee | |
| 2009/0115368 | A1 | 5/2009 | Bullis | |
| 2009/0174365 | A1 | 7/2009 | Lowenthal | |
| 2009/0187445 | A1 | 7/2009 | Barclay | |
| 2009/0200988 | A1 | 8/2009 | Bridges | |
| 2009/0210357 | A1 | 8/2009 | Pudar | |
| 2009/0222143 | A1 * | 9/2009 | Kempton | B60L 11/1824 700/291 |
| 2009/0313104 | A1 | 12/2009 | Hafner | |
| 2010/0013436 | A1 | 1/2010 | Lowenthal | |
| 2010/0017045 | A1 * | 1/2010 | Nesler | B60L 11/1824 700/296 |
| 2010/0039062 | A1 | 2/2010 | Gu | |
| 2010/0049533 | A1 | 2/2010 | Ferro | |
| 2010/0060016 | A1 | 3/2010 | Hunter | |
| 2010/0079004 | A1 | 4/2010 | Keefe | |
| 2010/0088261 | A1 | 4/2010 | Montalvo | |
| 2010/0106332 | A1 | 4/2010 | Chassin | |
| 2010/0107173 | A1 | 4/2010 | Chassin | |
| 2010/0112843 | A1 | 5/2010 | Heichal | |
| 2010/0114387 | A1 | 5/2010 | Chassin | |
| 2010/0138066 | A1 | 6/2010 | Kong | |
| 2010/0179704 | A1 | 7/2010 | Ozog | |
| 2010/0211340 | A1 | 8/2010 | Lowenthal | |
| 2010/0211643 | A1 | 8/2010 | Lowenthal | |
| 2010/0217550 | A1 | 8/2010 | Crabtree | |
| 2010/0217642 | A1 | 8/2010 | Crubtree | |
| 2010/0225266 | A1 | 9/2010 | Hartman | |
| 2010/0235004 | A1 | 9/2010 | Thind | |
| 2010/0277121 | A1 | 11/2010 | Hall | |
| 2011/0025556 | A1 | 2/2011 | Bridges | |
| 2011/0029148 | A1 | 2/2011 | Yang | |
| 2011/0035073 | A1 | 2/2011 | Ozog | |
| 2011/0196546 | A1 | 8/2011 | Muller | |
| 2011/0231028 | A1 | 9/2011 | Ozog | |
| 2012/0025620 | A1 * | 2/2012 | Stump | H02J 9/08 307/80 |
| 2013/0085624 | A1 | 4/2013 | Yang | |
| 2013/0123988 | A1 * | 5/2013 | Jariwala | B29C 67/0066 700/266 |
| 2013/0123997 | A1 * | 5/2013 | King | G06F 1/30 700/292 |
| 2013/0173331 | A1 | 7/2013 | Mohagheghi | |
| 2013/0254151 | A1 | 9/2013 | Mohagheghi | |

FOREIGN PATENT DOCUMENTS

| | | | |
|---|---|---|---|
| WO | 2012057846 | A1 | 5/2012 |
| WO | 2012082173 | A1 | 6/2012 |

OTHER PUBLICATIONS

Turton, H. & Moura, F., "Vehicle-to-grid systems for sustainable development: an integrated energy analysis," 2007.

(56) References Cited

OTHER PUBLICATIONS

Bradley, T., Frank, A., "Design, demonstrations and sustainability impact assessments for plug-in hybrid electric vehicles," Renewable and Sustainable Energy Reviews, 2007, 14 pages.
Romm, J., "The car and fuel of the future," Energy Policy, vol. 34, Issue 17, 2006, pp. 2609-2614, 6 pages.
Kempton, W., Tomić, J., "Vehicle-to-grid power fundamentals: Calculating capacity and net revenue," Journal of Power Sources, vol. 144, Issue 1, 2005, pp. 268-279, 12 pages.
Kempton, W., Tomić, J., "Vehicle-to-grid power implementation: From stabilizing the grid to supporting large-scale renewable energy," Journal of Power Sources, vol. 144, Issue 1, 2005, pp. 280-294.
Kempton, W. and Letendre, S., "Electric vehicles as a new power source for electric utilities," Transportation Research Part D, vol. 2, No. 3, 1997, pp. 157-175, 19 pages.
Lund, H. and Kempton, W., "Integration of renewable energy into the transport and electricity sectors through V2G," Energy Policy, 2008, pp. 3578-3587, 10 pages.
Cromie, R., "Demand Response and Load Management Strategies for Electric Forklifts and Non-Road EV Fleets," retrieved from http://www.lifepo4.info/Battery_study/Articles_on_V2G/Electric_Forklift_and_Non-Road_EV_Fleets_-_Demand_Response_and_Load_Management_Strategies.pdf, at http://www.lifepo4.info/Battery_study/, last accessed May 13, 2014, 14 pages.
Danforth, J., "Plug-In Hybrid Charging in Los Angeles: Analysis of the Load-leveling Capacity for Charging Plug-in Hybrids in the Los Angeles Department of Water and Power Transmission Area," retrieved from http://www.lifepo4.info/Battery_study/Articles_on_V2G/Analysis_of_the_Load-leveling_Capacity_for_Charging_Plug-in_Hybrids_in_the_Los_Angeles_Department_of_Water_and_Power_Transmission_Area.pdf, at http://www.lifepo4.info/Battery_study/, last accessed May 13, 2014, 11 pages.
Kohlmann, R., "From hybrid systems towards sector-spanning integration: concepts for the use of wind energy for individual transport," Second International Renewable Energy Storage Conference, Bonn, 2007, 31 pages.
Schluchter, C., "Die Idee des Vehicle to grid (V2G)," 2007, 19 pages.
Nørgaard, P., Lund, H., Mathiesen, B., "The transport sectors potential contribution to the flexibility in the power sector required by large-scale wind power integration," Nordic Wind Power Conference, Roskilde, Denmark, 2007, 4 pages.
Ornelas, E., "PG&E's view: PHEVs, V2G and the Progress so far," PHEV 2007 Conference "Where the Grid Meets the Road," Winnipeg, Manitoba, 2007, 26 pages.
Parks, K., Denholm, P. and Markel, T., "Costs and emissions associated with plug-in hybrid electric vehicle charging in the Xcel Energy Colorado service territory," National Renewable Energy Laboratory—NREL/TP-640-41410, 2007.
Penney, T., Elling, J., "The race to connect cars, communities and renewables," Geotimes, Aug. 2005 (printed May 12, 2014 from http://www.geotimes.org/aug05/feature_pluginhybrid.html), 5 pages.
U. Wang, "An Electric Hybrid Truck Designed for Utility Fleets That Can Power Your Home," Jan. 24, 2012, printed Jun. 8, 2012 from http://www.forbes.com/sites/uciliawang/2012/01/24/an-electric-hybrid-truck-designed-for-utility-fleets/, 4 pages.
"When Grids Get Smart—ABB's Vision for the Smart Grid," 2008, ABB, 8 pages.
"References for 'Vehicle-to-Grid' and 'Electric Vehicle Batteries,'" Last updated Sep. 10, 2008, printed Aug. 19, 2011 from http://www.spinnovation.com/sn/, 9 pages.
"References for 'Vehicle-to-Grid' and 'Electrtic Vehicle Batteries,'" Last updated Sep. 10, 2008, printed Apr. 18, 2014 from http://www.lifep4.info/Battery_study/, 9 pages.
J. Tomic, W. Kempton, "Using fleets of electric-drive vehicles for grid support," Journal of Power Sources, vol. 168, 2007, pp. 459-468.
A. N. Brooks, "Final Report—Vehicle-to-Grid Demonstration Project: Grid Regulation Ancillary Service with a Battery Electric Vehicle," 2002, 61 pages.
W. Kempton, T. Kubo, "Electric-drive vehicles for peak power in Japan," Energy Policy, vol. 28, 2000, pp. 9-18.
A. N. Brooks, S.H. Thesen, "PG&E and Tesla Motors: Vehicle to Grid Demonstration and Evaluation Program," 2007, 10 pages.
M. Kintner-Meyer, "What Plug-in Hybrid-Electric Vehicles Can Do for the Grid?," 2007, 23 pages.
K. Parks, K Davies, P. Denholm, T. Markel, "Plug-in Hybrid Benefits to the Xcel Energy Colorado System," 2007, 21 pages.
J. Tomic, "Vehicle-to-Grid Power Economics from a Fleet Perspective," 2005, 23 pages.
D. Hawkins, "Vehicle to Grid—A Control Area Operators Perspective," 2001, 15 pages.
M. Clayton, "Electric cars that pay," The Christian Science Monitor, Boston, Mass., Jul. 29, 2004, printed Nov. 19, 2007 from http://proquest.umi.com/pqdweb?did=670686481&sid=1&Fmt=3&clientld=14739&RQT=309&VName=PQD, 2 pages.
S. E. Letendre, W. Kempton, "The V2G Concept: A New Model for Power?—Connecting utility infrastructure and automobiles.," Public Utilities Fortnightly, Feb. 15, 2002, pp. 16-26, 9 pages.
"The Garage: Focus on Autos; Garage Briefs / Green Scene; A two-way street with these hybrids," Los Angeles Times, Los Angeles, Calif., Apr. 28, 2007, printed Nov. 19, 2007 from http://proquest.umi.com/pqdweb?did=1261725951&sid=1&Fmt=3&clientld=14739&RQT=309&VName=PQD, 1 page.
A. Brooks, T. Gage, "Integration of Electric Drive Vehicles with the Electric Power Grid—a New Value Stream," 2001, 15 pages.
S. Rahman, Y. Teklu, "Role of the Electric Vehicle as a Distributed Resource," IEEE Power Engineering Society Winter Meeting, 2000, pp. 528-533, vol. 1.
M. Doostizadeh, M. Khanabadi, A. Esmaeilian, M. Mohseninezhad, "Optimal Energy Management of a Retailer with Smart Metering and Plug-in Hybrid Electric Vehicle," 10th International Conference on Environment and Electrical Engineering (EEEIC), May 2011, 5 pages.
Lee Young, International Searching Authority (ISA/US), International Search Report and Written Opinion for corresponding International Application No. PCT/US2012/055118, United States Patent and Trademark Office, mailed Nov. 9, 2012, 16 pages.
C. Pang, P. Dutta, S. Kim, M. Kezunovic, I. Damnjanovic, "PHEVS as Dynamically Configurable Dispersed Energy Storage for V2B Uses in the Smart Grid," 7th Mediterranean Conference and Exhibitiion on Power Generation, Transmission, Distribution and Energy (MedPower 2010), Nov. 7-10, 2010, pp. 1-6, 2 pages.
W. Kempton, J. Tomic, "Vehicle-to-grid power implementation: From stabilizing the grid to supporting large-scale renewable energy,"Journal of Power Sources, Dec. 8, 2004, 15 pages.
IEEE Xplore Abstract for C. Pang, P. Dutta, S. Kim, M. Kezunovic, I. Damnjanovic, "PHEVS as Dynamically Configurable Dispersed Energy Storage for V2B Uses in the Smart Grid," 7th Mediterranean Conference and Exhibitiion on Power Generation, Transmission, Distribution and Energy (MedPower 2010), printed Oct. 22, 2012, 6 pages.
X. Fang, S. Misra, G. Xue, D Yang, "Smart Grid—The New and Improved Power Grid: A Survey," 2011, from http://www.public.asu.edu/~xfang5/survey_smartgrid_2011.pdf, 37 pages.
IEEE Xplore Abstract for X. Fang, S. Misra, G. Xue, D Yang, "Smart Grid—The New and Improved Power Grid: A Survey," printed Apr. 25, 2014, 1 pages.
X. Fang, S. Misra, G. Xue, D Yang, "Smart Grid—The New and Improved Power Grid: A Survey," IEEE Communications Surveys & Tutorials, vol. 14, No. 4, Fourth Quarter 2012, pp. 944-980.
Frank, A., "The plug-in hybrid electric vehicle, for petroleum displacement, reduction of co2 , electric grid economics,—system implications and direct use of renewable energy," retrieved Apr. 26, 2014 from http://www.lifepo4.info/Battery_study/Articles_on_V2G/the_plug-in_hybrid_electric_vehicle_for_petroleum_displacement_reduction_of_CO2_electric_grid_economics-_system_implications_and_direct_use_of_renewable_energy.pdf, 7 pages.

(56) References Cited

OTHER PUBLICATIONS

Gage, T., "The eBox—A New EV with Li Ion Battery and V2G," retrieved Apr. 26, 2014 from http://www.lifepo4.info/Battery_study/Articles_on_V2G/The_eBox_-_A_New_EV_with_Lilon_Battery_and_V2G.pdf, 14 pages.
Kurani, K., Heffner, R., Turrentine, T., "Driving Plug-In Hybrid Electric Vehicles: Reports from U.S. Drivers of HEVs, converted to PHEVs, circa Jul. 2006," retrieved Apr. 28, 2014 from http://www.lifepo4.info/Battery_study/Reports/Driving_Plug-In_Hybrid_Electric_Vehicles_-_reports_from_US_drivers_of_PHEVs.pdf, 33 pages.
Letendre, S., Perez, R., & Herig, C., "Battery-powered, electric-drive vehicles providing buffer storage for PV capacity value," retrieved Apr. 26, 2014 from http://www.lifepo4.info/battery_study/Articles_on_V2G/battery-powered_electric-drive_vehicles_providing_buffer_storage_for_pv_capacity_value.pdf, 6 pages.
Denholm, P., Short, W., "An Evaluation of Utility System Impacts and Benefits of Optimally Dispatched Plug-In Hybrid Electric Vehicles," Technical Report NREL/TP-620-40293, retrieved Apr. 28, 2014 from http://www.lifepo4.info/Battery_study/Reports/An_Evaluation_of_Utility_System_Impacts_and_Benefits_of_Optimally_Dispatched_Plug-In_Hybrid_Electric_Vehicles.pdf, 30 pages.
Moura, F., "Driving energy system transformation with "vehicle-to-grid" power," IIASA Interim Report IR-06-025, retrieved Apr. 28, 2014 from http://www.lifepo4.info/Battery_study/Reports/Driving_Energy_System_Transformation_with_Vehicle-to-Grid_Power.pdf, 52 pages.
Short, W., Denholm, P., "A Preliminary Assessment of Plug-In Hybrid Electric Vehicles on Wind Energy Markets, Technical Report," NREL/TP-620-39729, retrieved Apr. 28, 2014 from http://www.lifepo4.info/Battery_study/Reports/A_Preliminary_Assessment_of_Plug-In_Hybrid_Electric_Vehicles_on_Wind_Energy_Markets.pdf, 41 pages.
Kempton, W., Tomić, J., Letendre, S., Brooks, A., Lipman, T., "Vehicle-to-grid: battery, hybrid, and fuel cell vehicles as resources for distributed electric power in California," Institute for Transportation Studies, Paper IUCD-ITS-RR 01-03, retrieved Apr. 28, 2014 from http://www.lifepo4.info/Battery_study/Reports/Vehicle-to-Grid_Power_Battery_Hybrid_and_Fuel_Cell_Vehicles_as_Resources_for_Distributed_Electric_Power_in_California.pdf, 46 pages.
Sauer, D. "Technology and transition scenarios on the road to 2050—which energy carriers are needed and how to include the mobility sector," retrieved May 11, 2014 from http://www.lifepo4.info/Battery_study/Presentation/Technology_and_transition_scenarios_on_the_road_to_2050.pdf.
Innes, E., "Future impact of PHEV on utilities," PHEV 2007 Conference "Where the Grid Meets the Road", retrieved May 11, 2014 from http://www.lifepo4.info/Battery_study/Presentation/Future_impact_of_PHEVs_on_Utilities.pdf, 21 pages.
Kempton, W., "Vehicle to Grid Power, Briefing for: Federal Energy Regulatory Commission," retrieved May 11, 2014 from http://www.lifepo4.info/Battery_study/Presentation/V2G_-_Briefing_for_Federal_Energy_Regulatory_Commission.pdf, 31 pages.
Letendre, S.,"Plug-In Hybrid Electric Vehicles and the Vermont Grid: A Scoping Analysis," retrieved May 11, 2014 from http://www.lifepo4.info/Battery_study/Presentation/Plug-In_Hybrid_Electric_Vehicles_the_Vermont_Grid_-.pdf, 24 pages.
Liebman, A., & Walker, G., "Vehicle-to-Grid: Plug-In Hybrids will save the electricity system and the climate-system," retrieved May 11, 2014 from http://www.lifepo4.info/Battery_study/Presentation/V2G_-_Plug-In_Hybrids_will_save_the_electricity_system.pdf, 10 pages.
Bradford, T., "Vehicle to Grid (V2G): Technologies, Applications, and Economics," retrieved May 12, 2014 from http://www.lifepo4.info/Battery_study/Presentation/V2G_Technologies_Applications_and_Economics.pdf, 18 pages.
Denholm, P., "Plug-in Hybrid Electric Vehicles: New Load or New Resource?," UW Energy Institute Seminar Series, retrieved May 12, 2014 from http://www.lifepo4.info/Battery_study/Presentation/Plug-in_Hybrid_Electric_Vehicles_-_load_or_resource.pdf.
Kempton, W., "Vehicle to Grid Power as Wind Storage," retrieved May 12, 2014 from http://www.lifepo4.info/Battery_study/Presentation/VTG_power_as_wind_storage.pdf, 40 pages.
Kempton, W. & Murley, C., "Modeling V2G for a Utility with a High Wind Generation Portfolio," retrieved May 12, 2014 from http://www.lifepo4.info/Battery_study/Presentation/Modeling_V2G_for_a_Utility_with_a_High_Wind_Generation_Portfolio.pdf, 21 pages.
Tomić, J. & Kempton, W., "ZEVs in Vehicle-to-Grid (V2G) Applications," ZEV Symposium, CARB, retrieved May 12, 2014 from http://www.lifepo4.info/Battery_study/Presentation/tomic_ZEVs_in_Vehicle-to-Grid_V2G_Applications.pdf, 23 pages.
Nishinaga, E., "Vehicle to Grid (V2G) to Support BART Electrical Demand," retrieved May 12, 2014 from http://www.lifepo4.info/Battery_study/Presentation/nishinaga_-_V2G_to_support_BART_electrical_demand.pdf, 39 pages.
Tornić, J. and Kempton, W., "Using Electric Vehicles for Grid-Connected Storage," retrieved May 12, 2014 from http://www.lifepo4.info/Battery_study/Presentation/Using_EVs_for_Grid-Connected_Storage.pdf, 35 pages.
Gage, T., "The Car, the Grid, the Future," retrieved May 12, 2014 from http://www.lifepo4.info/Battery_study/Presentation/The_Seattle_Electric_Vehicle_to_Grid_V2G_Forum/Gage-V2G-June05-CarGr.pdf.
Kempton, W., "Vehicle to Grid Power," retrieved May 12, 2014 from http://www.lifepo4.info/Battery_study/Presentation/The_Seattle_Electric_Vehicle_to_Grid_V2G_Forum/Kempton-V2G-June05.pdf, 21 pages.
Cocconi, A. and Gage, T., "Connected Cars: Battery Electrics & Plug in Hybrids," retrieved May 12, 2014 from http://www.lifepo4.info/Battery_study/Presentation/The_Seattle_Electric_Vehicle_to_Grid_V2G_Forum/CocconiGage-V2G-June05.pdf, 25 pages.
Kempton, W., "Automobiles: Designing the 21st century fleet," retrieved May 12, 2014 from http://www.lifepo4.info/Battery_study/Presentation/The_Seattle_Electric_Vehicle_to_Grid_V2G_Forum/Kempton-V2G-Designing-June05.pdf, 13 pages.
Lambert, F., "Standards for V2G Interconnection to the Grid," retrieved May 12, 2014 from http://www.lifepo4.info/Battery_study/Presentation/The_Seattle_Electric_Vehicle_to_Grid_V2G_Forum/Lambert-V2G-June05.pdf, 19 pages.
Letendre, S., "Public-Private Strategies to Grow a V2G Industry in Washington State," retrieved May 12, 2014 from http://www.lifepo4.info/Battery_study/Presentation/The_Seattle_Electric_Vehicle_to_Grid_V2G_Forum/Letendre-V2G-June05.pdf, 13 pages.
Kempton, W., "Vehicle to Grid Power," Analysis Seminar, NREL, Washington, DC, printed May 12, 2014 from http://www.lifepo4.info/Battery_study/Presentation/nrel-dc-28sep05-1.ppt, 41 pages.
Brooks, A., "Electric Drive Vehicles: A Huge New Distributed Energy Resource," retrieved May 12, 2014 from http://www.lifepo4.info/Battery_study/Presentation/A_Brooks_ETI_conf.pdf.
Walker, G., "Hybrid Electric Vehicles meet the Electricity Grid: Plug-in Hybrids (PHEVs) & Vehicle to Grid (V2G)," printed May 12, 2014 from http://www.lifepo4.info/Battery_study/Presentation/V2G_2_GRW.ppt, 41 pages.
Green Car Congress, "Xcel Energy Announces Six-Month Test of V2G and Plug-In Hybrid Electric Vehicles," retrieved May 12, 2014 from http://www.lifepo4.info/Battery_study/Press/Green_Car_Congress_Xcel_Energy_Announces_Six-Month_Test_of_V . . . pdf, 1 page.
Fialka, J., "In Quest for Cleaner Energy, Texas City Touts Plug-In Car," Wall Street Journal, printed May 12, 2014 from http://online.wsj.com/news/articles/SB117487062847548559.
Letendre, S., Denholm, P., Lilienthal, P., "Electric and Hybrid Vehicles: New Load or New Resource?", Public Utilities Fortnightly, pp. 28-37, Dec. 2006, 4 pages.

(56) References Cited

OTHER PUBLICATIONS

Kempton, W. and A. Dhanju, "Electric Vehicles with V2G: Storage for Large-Scale Wind Power," Windtech International, 2006, 4 pages.

Frank, A., "Plug-in hybrid vehicles for a sustainable future," American Scientist, vol. 95, No. 2, pp. 158-165, printed May 12, 2014 from http://www.americanscientist.org/issues/id.1021,y.2007,no.2,content.true,page.1,css.print/issue.aspx and http://www.americanscientist.org/issues/num2/2007/2/plug-in-hybrid-vehicles-for-a-sustainable-future/1.

University of Delaware, "The Grid-Integrated Vehicle with Vehicle to Grid Technology," printed May 12, 2014 from http://www.udel.edu/V2G/, 1 page.

Vandael, S., Holvoet, T., Deconinck G., Kamboj, S., Kempton, W., "A comparison of two GIV mechanisms for providing ancillary services at the University of Delaware," IEEE SmartGridComm 2013 Symposium, Demand Side Management, Demand Response, Dynamic Pricing, 2013, 6 pages.

University of Delaware, "The Grid-Integrated Vehicle with Vehicle to Grid Technology," "Articles and Papers on GIV and Evs," printed May 12, 2014 from http://www.udel.edu/V2G/ArticlesandPapers.html, 5 pages.

Udo, V., "Proven at PJM: Vehicle to Grid (V2G) and Power System/Transportation Synergies," printed May 12, 2014 from http://www.energypulse.net/centers/article/article_print.cfm?a_id=1878, 7 pages.

Motavalli, J., "Greentech: The Real Power of the Prius," The New York Times, printed Jun. 24, 2014 from http://query.nytimes.com/gst/fullpage.html?res=9A00E5DC1E3FF931A3575AC0A9619C8B63, 2 pages.

Quong, A., "Tesla Plugs in to PG&E Research," retrieved May 12, 2014 from http://www.lifepo4.info/Battery_study/Press/RedHerring_-_Tesla_pligs_in_to_PGE_research.pdf, 1 pages.

* cited by examiner

SYSTEMS AND METHODS FOR RESTORING SERVICE WITHIN ELECTRICAL POWER SYSTEMS

CROSS REFERENCE TO RELATED APPLICATION(S)

This application is a 35 U.S.C. §371 national stage filing of International Application No. PCT/US2012/055118, filed 13 Sep. 2012, which claims the benefit of and priority to U.S. Provisional Patent Application Ser. No. 61/553,398, which was filed on 31 Oct. 2011 and is entitled "SYSTEMS AND METHODS FOR RESTORING SERVICE WITHIN ELECTRICAL POWER SYSTEMS." The complete disclosure(s) of the above-identified patent application(s) is/are hereby incorporated by reference for all purposes.

FIELD OF THE DISCLOSURE

The present disclosure relates to restoring service within electrical power systems, and more particularly to restoring service using mobile energy resources.

BACKGROUND

When a fault occurs in an electrical power system, such as an electrical power distribution system, the fault may be isolated. In some examples, isolating the fault may additionally isolate a healthy downstream area, which would cause an outage for the customers in the otherwise healthy downstream area while the faulty circuit is being repaired. Various service restoration schemes and algorithms may be used to restore power to the customers in the isolated, but healthy, downstream area using alternative sources and/or circuits to provide power to these customers through alternative routes so that the outage time experienced by the downstream customers may be reduced or minimized.

Examples of electrical power service restoration are disclosed in U.S. Pat. Nos. 6,907,321 and 7,705,487; and in U.S. Patent Application Publication No. 2011/0029148. Examples of using electric vehicles to supply power to an electric power grid are disclosed in U.S. Pat. Nos. 5,642,270 and 7,747,739; in U.S. Patent Application Publication Nos. 2007/0282495, 2008/0040479 and 2010/0277121; and in U.S. Provisional Patent Application Ser. No. 61/408,157, which was filed on Oct. 29, 2010 and is entitled "Dispatching Mobile Energy Resources to Respond to Electric Power Grid Conditions." The disclosures of these and all other publications referenced herein are incorporated by reference in their entirety for all purposes.

SUMMARY

In some examples, methods for restoring service within electrical power systems may include identifying a restoration path for an outage area within a power system, selecting a mobile energy resource connection site, sending power injection requests to a plurality of mobile energy resources, receiving power injection acceptances from participating ones of the plurality of mobile energy resources, and implementing the restoration path. The mobile energy resource connection site may be electrically connected to at least one of the restoration path and the outage area. At least some of the plurality of mobile energy resources may be proximate the connection site.

In some examples, methods for restoring service within electrical power systems may include identifying a restoration path for an outage area within a power system, selecting an electric vehicle charging station, sending discharge requests to a plurality of electric vehicles, receiving discharge acceptances from participating ones of the plurality of electric vehicles, and implementing the restoration path. The electric vehicle charging station may be electrically connected to at least one of the restoration path and the outage area. At least some of the plurality of electric vehicles may be proximate the charging station.

In some examples, systems for restoring service within electrical power systems may include a processor, and a computer readable storage medium having a plurality of machine-readable instructions embodied thereon and configured for execution by the processor. The plurality of machine-readable instructions may include instructions to identify a restoration path for an outage area within a power system, instructions to select at least one electric vehicle charging station, instructions to send power injection requests to a plurality of electric vehicles, instructions to receive power injection acceptances from participating ones of the plurality of electric vehicles, and instructions to implement the restoration path. The selected electric vehicle charging station may be electrically connected to at least one of the restoration path and the outage area. At least some of the plurality of electric vehicles may be proximate the charging station.

DETAILED DESCRIPTION

Figure 1:
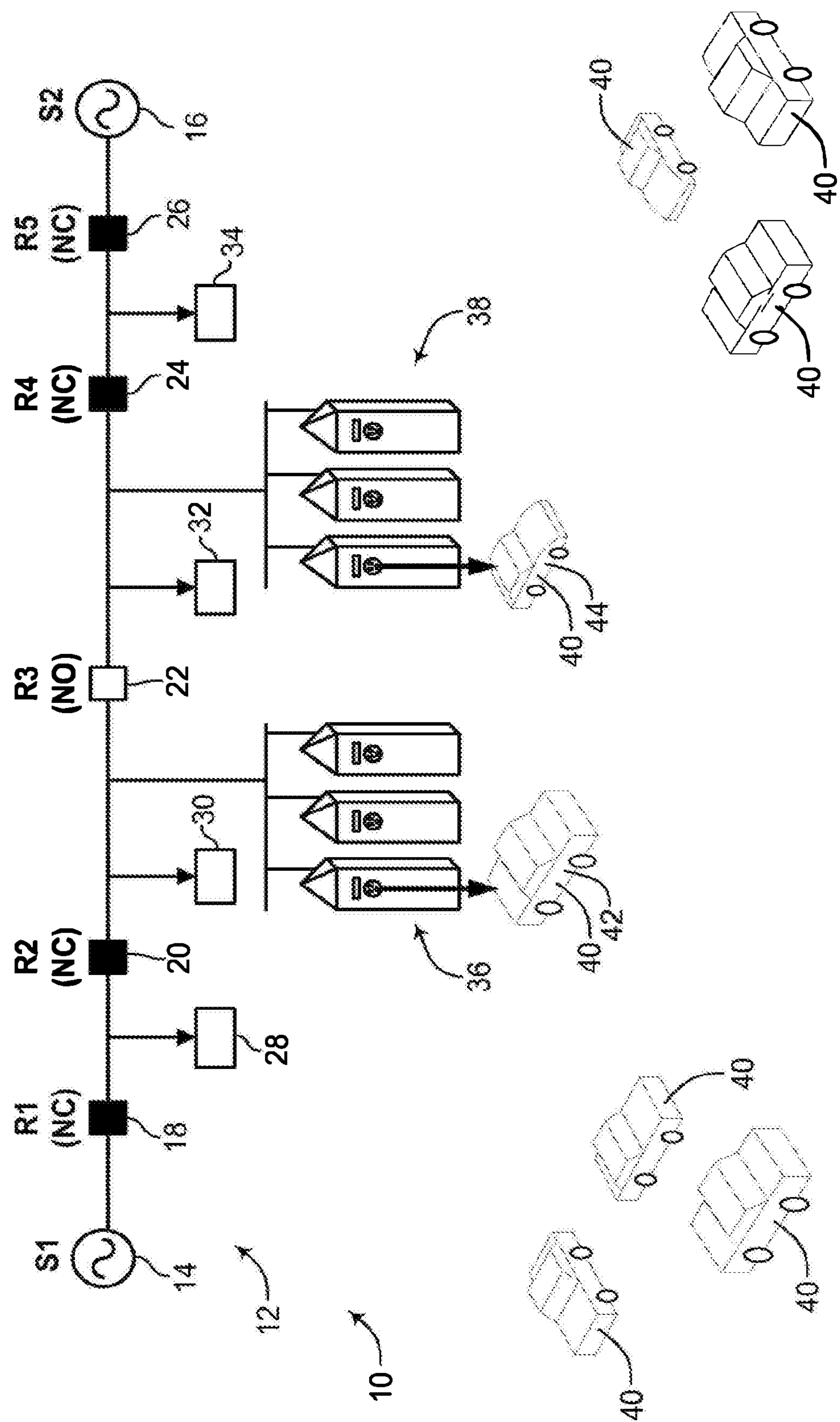
FIG. 1 is a one-line diagram of a nonexclusive illustrative example of an electrical power system suitable for use with the disclosed methods and systems.

As will be more fully set out below, mobile energy resources, such as plug-in hybrid or electric vehicles, may be integrated into electrical power systems, such as electrical power distribution systems or power grids, such as for response to various electric power grid conditions. For example, mobile energy resources may be used for demand or power response and/or service restoration applications, such as during a shortage of electrical power supply or to supply electricity to customers within an outage area. In some examples, information regarding the geographical position of one or more mobile energy resources and/or their level(s) of charge may be used to evaluate possible candidates for integration into an electric power grid, such as to respond to an outage or a shortage of supply in a specific area or areas of an electrical power system.

As used herein, an electrical power system or power grid may refer to an electrical power distribution system or network that connects producers of power with consumers of power. The electrical power system may include generators, transformers, interconnects, switching stations, and safety equipment as part of a transmission system for supplying bulk power and/or a distribution system for supplying retail power. It should be understood that the systems and methods disclosed herein may be vertically scaled, such as for use with a neighborhood, a city, a sector, a control area, or even one or more large-scale interconnects, such as one or more of the eight large-scale Interconnects in the North American Electric Reliability Council (NERC). The disclosed systems and methods may be horizontally scalable, such as for providing power services to multiple grid areas simultaneously.

An "energy resource," as used herein, refers to electrical entities that can be commanded or requested to provide or inject power, take or consume power and/or store energy. To provide or inject power, an energy resource may act as a power generator or source. To take power, an energy resource may act as a load and/or store energy. Nonexclusive illustrative examples of energy resources may include battery/charger/inverter systems for electric or hybrid vehicles, repositories of used-but-serviceable electric vehicle batteries, fixed energy storage, fuel cell generators, emergency generators, controllable loads, or the like.

As used herein, a "mobile energy resource," or "MER," may refer to an energy resource that may be dispatched, or otherwise available, to appear and/or be connected at various locations throughout the electrical power system, such as to provide a power response or injection into the electrical power system by way of connection sites variously located within the electrical power system. In some examples, the MER may itself be mobile such that it can be physically present at various geographic locations on or within the electrical power system, such as where the MER is an electric vehicle.

As used herein, "electric vehicle" should be broadly construed so as to refer to vehicles that have electrical power generation and/or storage capacity, as well as vehicles that can be connected to an electrical power system to recharge the vehicle's internal or on-board energy storage system. Thus, nonexclusive illustrative examples of "electric vehicles" include both pure electric and also hybrid electric vehicles, such as plug-in hybrid electric vehicles. Vehicle energy storage systems may include batteries, fuel cells, capacitors, flywheels, or the like, or any combination thereof.

A nonexclusive illustrative example of an electrical power system is shown generally at 10 in FIG. 1. Unless otherwise specified, electrical power system 10 may, but is not required to, contain at least one of the structures, components, functionalities, and/or variations described, illustrated, and/or incorporated herein. In the illustrated example, the electrical power system 10 includes an electrical power line in the form of a two-source distribution feeder 12. The feeder 12 is supplied from a pair of electrical sources 14, 16, and includes a plurality of switches 18, 20, 22, 24, 26. The switches 18, 20, 24, 26 are normally closed, and the feeder 12 is divided by the normally-open tie switch 22. A plurality of loads 28, 30, 32, 34 are supplied by the feeder 12. In addition, a pair of MER connection sites 36, 38 are also connected to the feeder 12.

A plurality of MERs 40 may be present, with at least some of the MERs 40 being proximate one or more of the connection sites 36, 38. As shown in FIG. 1, a first MER 42 is connected to, and receiving power from, the connection site 36, while a second MER 44 is connected to, and receiving power from, the connection site 38.

As may be understood, the plurality of MERs may be or include vehicles comprising electrical energy sources, such as where at least some of the MERs are electric vehicles. In such examples, the connection sites may be configured to selectively exchange power with, transfer power to, and/or receive power from, the vehicle's electrical energy source. For example, at least some of the plurality of MERs may be plug-in electric vehicles, and the MER connection sites may be electric vehicle charging stations. The electric vehicle charging stations may be configured for use with plug-in electric vehicles and may be configured to selectively transfer power to the plug-in electric vehicles, such as to charge the batteries or other power sources of the electric vehicles, and to selectively receive power from the plug-in electric vehicles, such as by discharging the batteries of the electric vehicles. As suggested in the nonexclusive illustrative example presented in FIG. 1, the illustrated MERs 40 are electric vehicles and the connection sites 36, 38 are electric vehicle charging stations. Thus, the first and second MERs 42, 44 are connected to, and having their energy sources charged by, the connection sites 36, 38.

Figure 2:
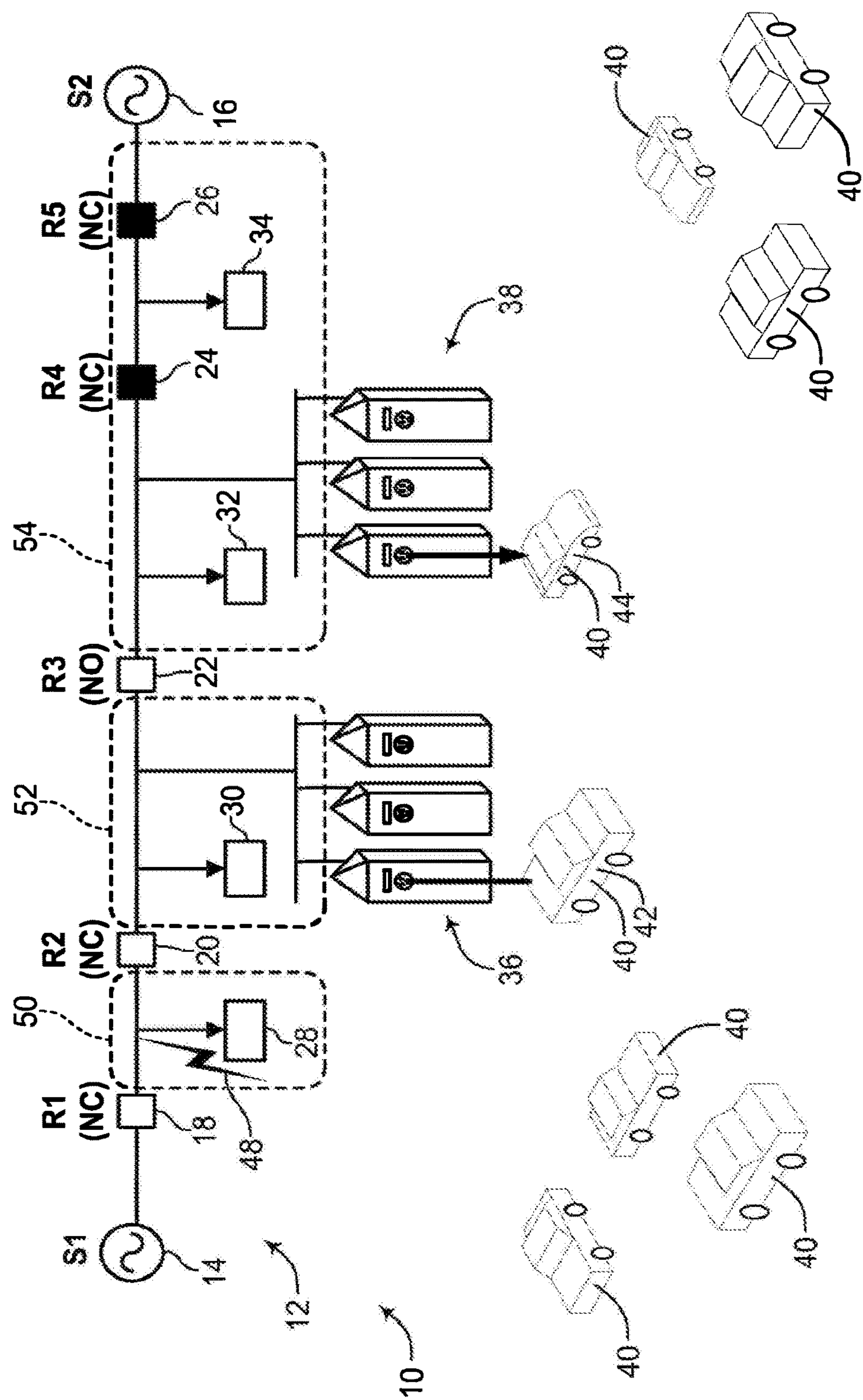
FIG. 2 is a one-line diagram of the electrical power system of FIG. 1, shown with an isolated fault and a resulting outage area.

As a nonexclusive illustrative example with reference to FIG. 2, a fault 48 may occur at or on the section or portion of the feeder 12 that is supplying the load 28. In response to the fault, the normally-closed switches 18, 20 may open, or be opened, to isolate the fault 48 and the load 28 within an isolated zone or area 50. The opening of the switches 18, 20 may be part of, or due to, execution or performance of a suitable fault detection and isolation process or algorithm. As may be understood, opening the switches 18, 20 would also isolate an otherwise healthy downstream area, thereby creating an outage area 52 that is isolated from the electrical sources 14, 16 such that the load 30 and the MER connection site 36 are without power, and the MER 42 is no longer receiving power from and/or being charged by the connection site 36.

As it may be desired to restore power to the loads within the outage area 52, the normally-open tie switch 22 may close, or be closed, such as due to the execution of a suitable fault detection, isolation and restoration (FDIR) process or algorithm. Upon closing the normally-open tie switch 22, the loads in the outage area 52 (i.e., the load 30 and the MER connection site 36) would then be supplied from the source 16, which would act as a restoration source for the outage area 52. As may be understood, in such an example, the source 16 would then supply a total load that includes the loads in the outage area 52 (i.e., load 30 and the connection site 36) in addition to the loads along the restoration path 54 (i.e., the loads 32, 34 and the connection site 38). If the source 16 has an insufficient capacity margin to supply the loads in the outage area 52 in addition to the loads along the restoration path 54, or one or more equipment rating limits along the restoration path are insufficient for the proposed restoration, the source 16 may not be suitable for use as a restoration source for the loads in the outage area 52. However, as explained in more detail below, injection of power from one or more of the MERs 40 back into the electrical power system 10 may permit or support restoring power to at least some of the loads in the outage area 52.

The following paragraphs describe nonexclusive illustrative examples of methods for restoring service within electrical power systems, using the concepts and components disclosed herein. The actions of the disclosed methods may be performed in the order in which they are presented below. However, unless the context indicates otherwise, it is within the scope of this disclosure for the actions, either alone or in various combinations, to be performed before and/or after any of the other actions. It is further within the scope of this disclosure for the disclosed methods to omit one or more of the disclosed actions and/or to include one or more actions in addition to those disclosed herein.

Figure 3:
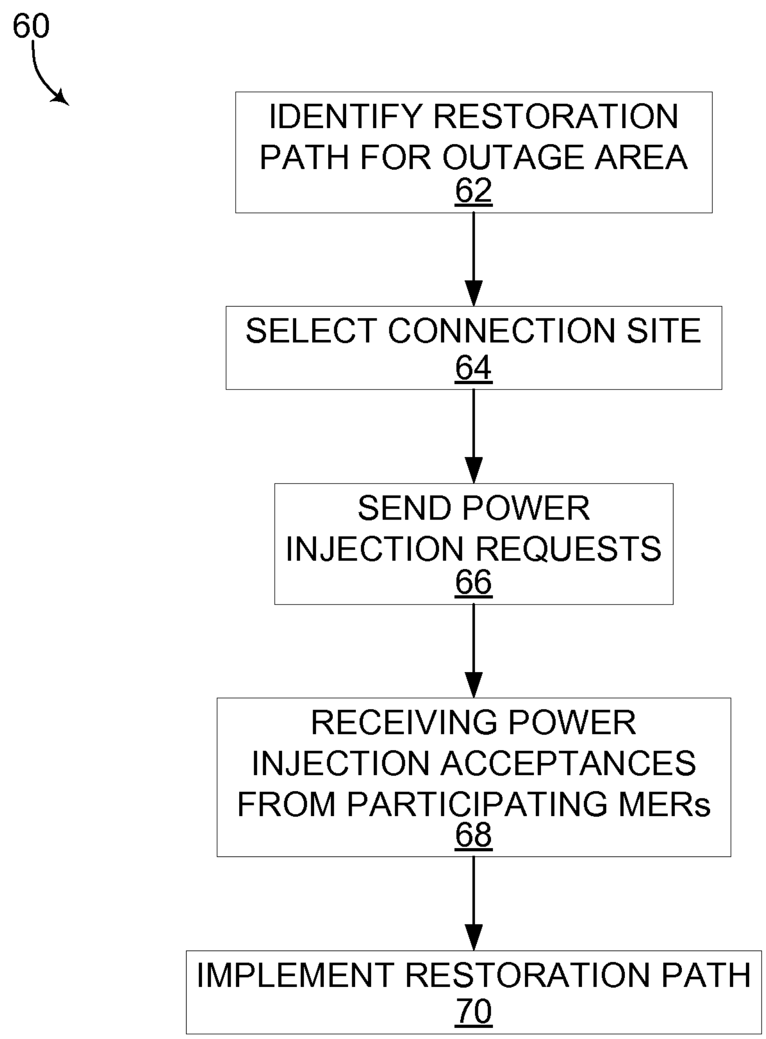
FIG. 3 is a flow chart showing a nonexclusive illustrative example of a method for restoring service within electrical power systems.

A nonexclusive illustrative example of methods for restoring service within electrical power systems is illustrated by the flowchart 60 in FIG. 3. As shown in FIG. 3, methods for restoring service within electrical power systems may include identifying a restoration path for an outage area within the power system, as indicated at block 62, selecting an MER connection site that is electrically connected to at least one of the restoration path and the outage area, as indicated at block 64, sending power injection requests to a plurality of MERs, as indicated at block 66, receiving power injection acceptances from participating ones of the plurality of MERs, as indicated at block 68, and implementing the restoration path, as indicated at block 70.

A restoration path may be identified for a particular outage area within a given power system based on any suitable criteria. For example, an FDIR algorithm may evaluate: available restoration sources for their capacity margin, restoration paths for their equipment rating limit margins, and outage area loads, to determine whether power may be restored to the outage area loads using one or more restoration sources and one or more restoration paths.

An MER connection site that is electrically connected to the restoration path and/or to the outage area may be identified and/or selected using any suitable method. For example, a connectivity matrix or network or connectivity model may be used if available.

Power injection requests may be sent to a plurality of MERs using any suitable method, such as a wireless communication link between a power system control and the various MERs.

In some examples, at least some of the MERs may be identified as, or determined to be, proximate at least one connection site, with at least some of the MERs being identified as being proximate a connection site that is electrically connected to the restoration path and/or to the outage area. In such examples, power injection requests may be sent to the identified MERs.

An MER may be identified as, or determined to be, proximate a connection site based on any suitable criteria. For example, an acceptable distance or contact area may be defined for at least some of the connection sites, with the MER being identified as being proximate the connection site when the MER is within the acceptable distance or area defined for the connection site. As a nonexclusive illustrative example, an acceptable distance may be a distance over which an MER may travel within a predefined time interval.

The power injection requests may direct the MERs to proceed to a connection site and inject power into the power system via the connection site. For example, the power injection requests may be discharge requests that include instructions directing the MER to proceed, drive and/or otherwise be moved to the connection site and inject power into the power system. Where the MERs are electric vehicles, the power injection requests may include instructions to proceed to an electric vehicle charging station, driving directions to the charging station, a discharge duration and/or amount, and/or details regarding a monetary incentive for compliance with the request.

The participating ones of the plurality of MERs may include those of the plurality of MERs that received power injection requests and signal or indicate that they will comply with the power injection request. The participating MERs may signal or indicate that they will comply with the power injection request in any suitable manner. For example, the participating MERs may transmit an acceptance signal indicating that they will proceed to the indicated connection site and inject power into the power system for a requested duration and/or in a requested amount. In some examples, the participating MERs may signal or otherwise indicate that they will comply with the power injection request by proceeding to the indicated connection site and injecting power into the power system.

Figure 4:
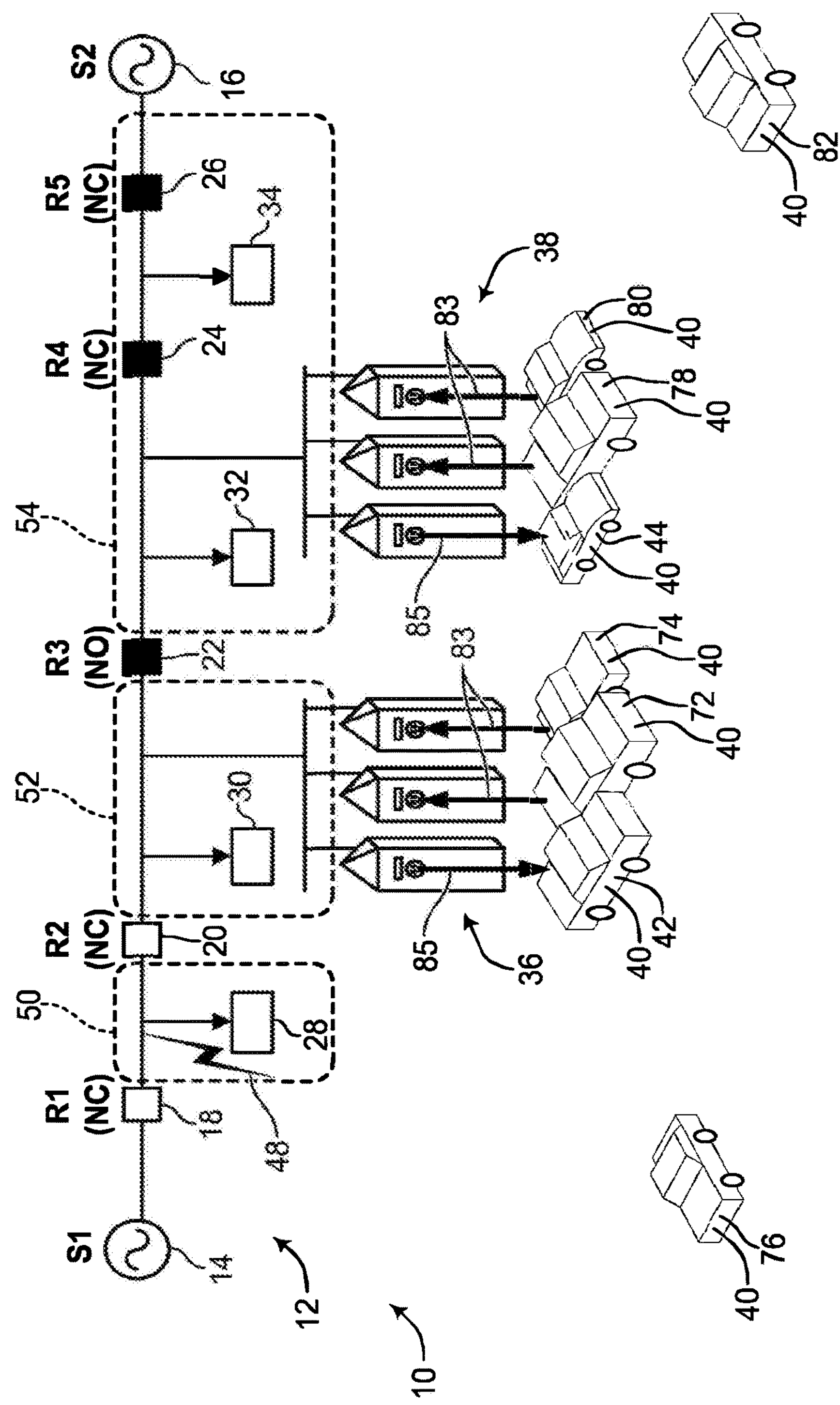
FIG. 4 is a one-line diagram of the electrical power system of FIGS. 1 and 2, shown with the isolated fault and a nonexclusive illustrative example of power being restored to the outage area through a restoration area.

A nonexclusive illustrative example of the method 60 of FIG. 3 may be discussed with regard to the electrical power system 10 illustrated in FIGS. 1, 2 and 4. As discussed above with regard to FIG. 2, the normally-closed switches 18, 20 were opened to isolate the fault 48, which resulted in creation of the outage area 52. To restore service to the loads in the outage area 52, a restoration path 54 may be identified for the outage area 52, with the source 16 being identified as a restoration source. However, the capacity margin of the source 16 may be insufficient to alone supply the loads in the outage area 52 in addition to the loads along the restoration path 54.

As shown in FIG. 4, the connection sites 36, 38 are electrically connected to, located in, and may be proximate respective ones of the outage area 52 and the restoration path 54. Accordingly, the connection sites 36, 38 may be selected to support restoring power to the outage area 52 using the restoration path 54 and using source 16 as a restoration source.

Power injection requests may be sent to at least some of the MERs 40, such as a subset of the MERs that are identified as, or determined to be, proximate to at least one of the connection sites 36, 38. The power injection requests may instruct the MERs to proceed to one of the connection sites 36, 38 and inject power into the electrical power system 10, such as by discharging their batteries, for at least a specified duration of time. In examples where location information is available regarding the MERs, such as by way of global positioning system (GPS) coordinates for the MERs, the MERs may be instructed to proceed to the closest one of the connection sites 36, 38. Thus, for example, at least some of the MERs 72, 74, 76 may have received power injection requests requesting that they proceed to the connection site 36, while at least some of the MERs 78, 80, 82 may have received power injection requests requesting that they proceed to the connection site 38.

As suggested in FIG. 4, the MERs 72, 74, 78, 80 may have accepted the received power injection requests and transmitted power injection acceptances, which may be received by the power system control system or operator. If the magnitude and/or duration of the power injections available from the participating MERs 72, 74, 78, 80, as may be determined from the received power injection acceptances, when combined with the capacity of the restoration source 16, is sufficient to permit restoring power to the outage area 52 by way of the restoration path 54, such as with little or no equipment rating limit violations along the restoration path, the power system control system or operator may plan or prepare to implement, or proceed with implementation of, the restoration path 54. In particular, the power system control system or operator may close the normally-open tie switch 22 to implement the restoration path 54 when the participating MERs 72, 74 are connected to the connection site 36, the participating MERs 78, 80 are connected to the connection site 38, and the participating MERs 72, 74, 78, 80 are configured to inject power into the electrical power system 10, as suggested by the arrows 83 in FIG. 4. In examples where the participating MERs 72, 74, 78, 80 are electric vehicles, they may be configured to inject power into the electrical power system 10 by discharging their batteries at the connection sites 36, 38.

The MERs 76, 82 may have declined to accept the power injection requests or may not have received the power injection requests. For example, the MERs 76, 82 may have been identified as not being sufficiently proximate to at least one of the connection sites 36, 38 such that power injection requests were not sent to the MERs 76, 82.

The MERs 42, 44, which were connected to, and receiving power from the connection sites 36, 38 prior to the fault, may continue or resume receiving power from the connection sites 36, 38, as suggested by the arrows 85 in FIG. 4. However, in some examples, either or both of the MERs 42, 44, if capable, may choose to discontinue receiving power from the connection sites 36, 38 and/or choose to inject power into the electrical power system 10. In particular, the MERs 42, 44 may receive power injection requests and accept or decline to accept the request.

Figure 5:
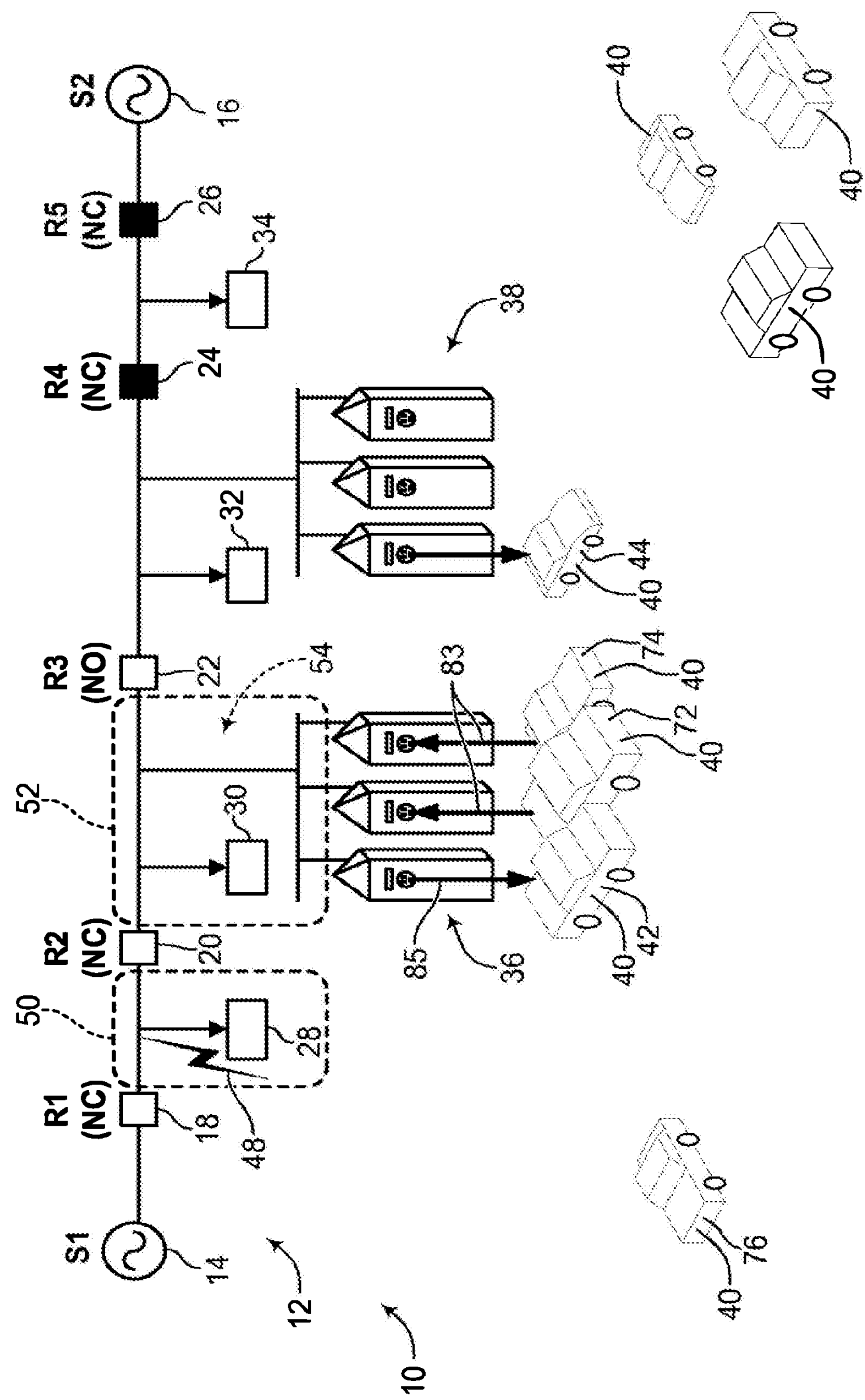
FIG. 5 is a one-line diagram of the electrical power system of FIGS. 1 and 2, shown with the isolated fault and another nonexclusive illustrative example of power being restored to the outage area.

Another nonexclusive illustrative example of the method 60 of FIG. 3 may be discussed with regard to the electrical power system 10 illustrated in FIGS. 1, 2 and 5. As discussed above with regard to FIG. 2, the normally-closed switches 18, 20 were opened to isolate the fault 48, which resulted in creation of the outage area 52. In some examples, it may be possible and/or desired to restore service to at least some of the loads in the outage area 52 without using the source 16, such as where the source 16 is not available as a restoration source.

As shown in FIG. 5, the connection site 36 is electrically connected to and located within the outage area 52. Accordingly, the connection site 36 may be identified as a restoration source for restoring service to at least some of the loads in the outage area 52 using a restoration path 54 that may be identified within the outage area 52 and is electrically connected to the connection site 36.

Power injection requests may be sent to at least some of the MERs 40. In examples where location information is available regarding the MERs, the power injection requests may be sent to a subset of the MERs that are identified as, or determined to be, proximate the connection site 36, which may include the MERs 72, 74, 76. The power injection requests may instruct at least some of the MERs 72, 74, 76 to proceed to the connection site 36 and inject power into the electrical power system 10, such as by discharging their batteries, for at least a specified duration of time.

As suggested in FIG. 5, the MERs 72, 74 may have accepted the received power injection requests and transmitted power injection acceptances, which may be received by the power system control system or operator. If the magnitude and/or duration of the power injections available from the participating MERs 72, 74, as may be determined from the received power injection acceptances, is sufficient to permit restoring power to the outage area 52 by way of the restoration path 54, the power system control system or operator may plan or prepare to implement, or proceed with implementation of, the restoration path 54. In particular, the power system control system or operator may implement the restoration path 54 when the participating MERs 72, 74 are connected to the connection site 36 and are configured to inject power into the electrical power system 10, as suggested by the arrows 83 in FIG. 5. In examples where the participating MERs 72, 74 are electric vehicles, they may be configured to inject power into the electrical power system 10 by discharging their batteries at the connection site 36.

The MER 76 may have declined to accept the power injection request or may not have received the power injection request. For example, the MER 76 may have been identified as not being sufficiently proximate to the connection site 36 such that a power injection request was not sent to the MER 76.

The MER 42, which was connected to, and receiving power from the connection site 36 prior to the fault, may continue or resume receiving power from the connection site 36, as suggested by the arrow 85 in FIG. 5. However, in some examples, the MER 42, if capable, may choose to discontinue receiving power from the connection site 36 and/or choose to inject power into the electrical power system 10. In particular, the MER 42 may receive a power injection request and accept or decline to accept the request.

Figure 6:
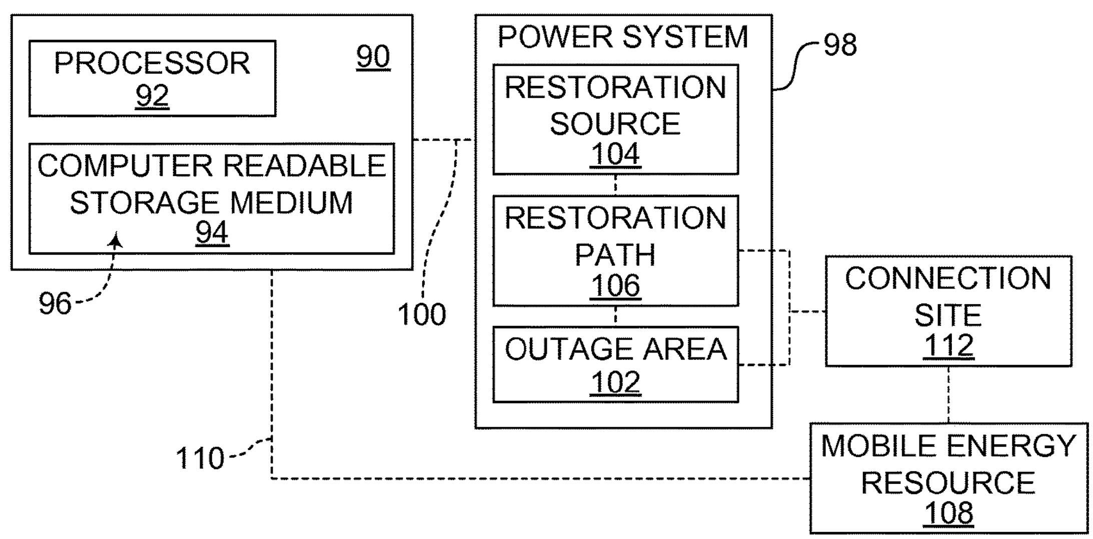
FIG. 6 is a block diagram of a system for restoring service within electrical power systems.

A nonexclusive illustrative example of a system for restoring service within an electrical power system is shown generally at 90 in FIG. 6. Unless otherwise specified, system 90 may, but is not required to, contain at least one of the structures, components, functionalities, and/or variations described, illustrated, and/or incorporated herein. In the illustrated example, the system 90 includes a processor 92 and a computer readable storage medium 94, which may have a plurality of machine-readable instructions 96 embodied thereon and configured for execution by the processor, such as to carry out the methods disclosed herein.

As shown in FIG. 6, the system 90 may be linked or connected to an electrical power system 98 by way of a suitable communication link or path 100, which may be wired or wireless. The system 90 may restore service to an outage area 102 within the electrical power system 98 by identifying a restoration source 104 and executing one or more switching actions to implement a restoration path 106 between the restoration source 104 and the outage area 102.

The system 90 may be capable of communicating with, or otherwise linked to, at least one MER 108 by way of a suitable communication link or path 110, such as a wireless or other link. Power injection requests may be sent from the system 90 to the MER 108 and/or power injection acceptances may be sent from the MER 108, and received by the system 90, by way of the communication path 110.

The MER 108, such as in response to a power injection request sent from the system 90 by way of the communication path 110, may proceed to a connection site 112, connect with or engage the connection site, and inject power into the electrical power system 98 by way of the connection site 112.

Figure 7:
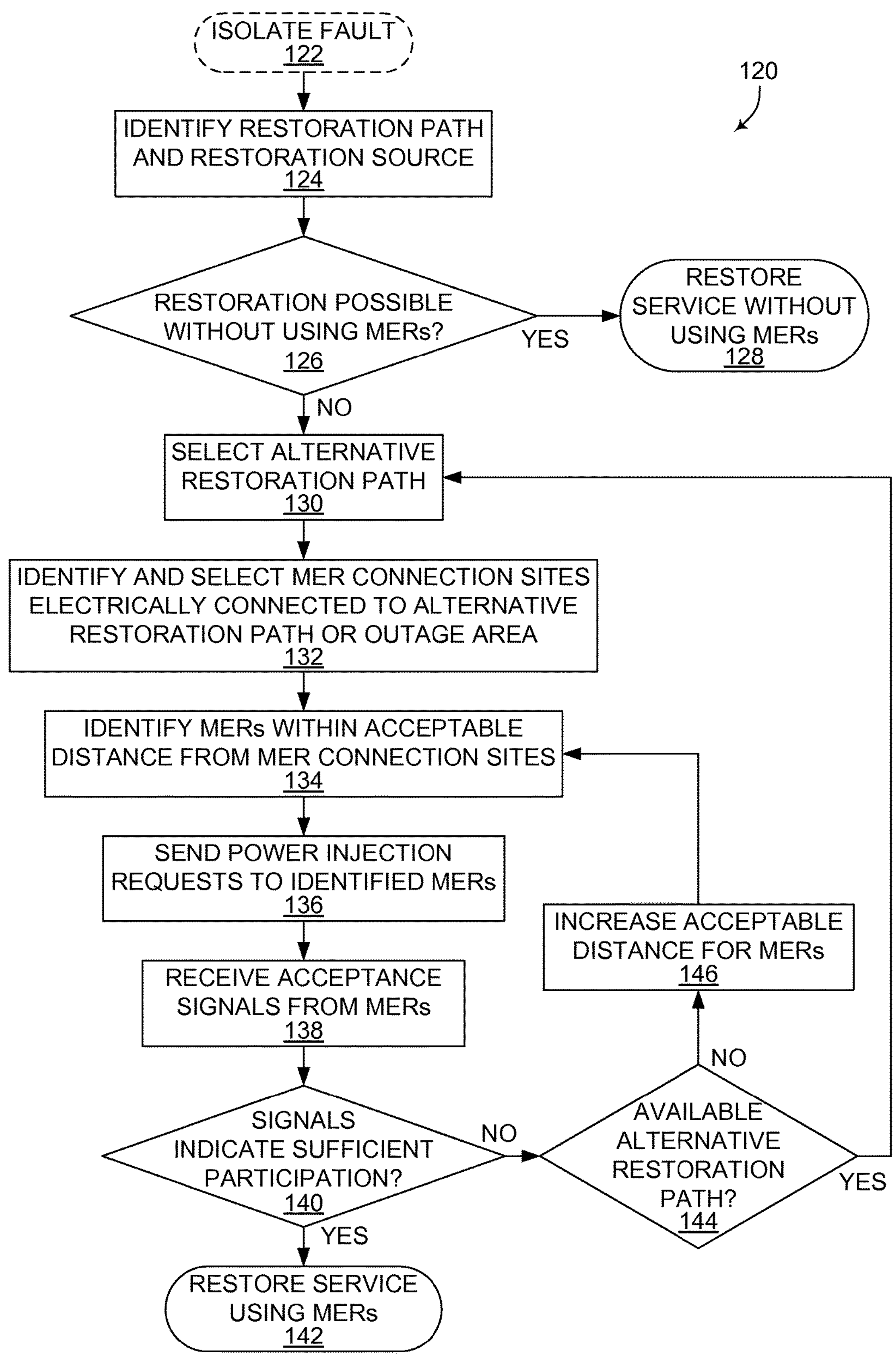
FIG. 7 is flow chart showing another nonexclusive illustrative example of a method for restoring service within electrical power systems.

Another nonexclusive illustrative example of methods for restoring service within electrical power systems is illustrated by the flowchart 120 in FIG. 7. As shown in FIG. 7, after isolating a fault in the electrical power system, as indicated at block 122, methods for restoring service within electrical power systems may begin with identifying at least one restoration path and at least one restoration source, as indicated at block 124.

If a feasible restoration path and a feasible restoration source exist such that restoration is possible without needing to use energy from MERs, as determined at block 126, restoration switching actions may be performed to restore service to the outage area without using MERs, as indicated at block 128. However, if restoration without using energy from MERs is not possible due to the lack of either a feasible restoration path or a feasible restoration source, as determined at block 126, an alternative restoration path may be identified and selected, as indicated at block 130. In some examples, restoration without using energy from MERs may be determined to be not possible at block 126 due to the lack of either a source or restoration path with sufficient capacity margin to support restoring service to the outage area.

The alternative restoration path selected at block 130 may be a next available identified restoration path that, for example, relatively closely matches the required capacity and has at least one MER connection site electrically connected thereto. In some examples, a connectivity matrix approach can be used to determine whether or not there are MER connection sites electrically connected to a potential restoration path.

MER connection sites electrically connected to the alternative restoration path and/or outage area circuits may be identified and selected, as indicated at block 132. At least some of the MER connection sites may be identified and selected after selecting an alternative restoration path, and/or at least some of the MER connection sites may be identified and selected before selecting an alternative restoration path, such as where the availability of MER connections sites, or lack thereof, may be considered when selecting an alternative restoration path. The electrically connected MER connection sites may be identified, for example, by using the connectivity matrix.

MER connection sites may be selected using any suitable criteria. For example, MER connection sites may be selected based on their distance from a potential or selected restoration path and/or from the outage area, their capacity, their current load, or the like.

MERs within an acceptable distance from the MER connection sites may be identified or otherwise determined, as indicated at block 134. In some examples, MERs may be identified as being within an acceptable distance from the MER connection sites when the MERs are within a predefined geographical proximity from at least one identified MER connection site. In some examples, the predefined geographical proximity may be defined by a system operator based on factors such as an expected travel or driving distance and/or time from an MER's current location to at least one of the MER connection sites.

If there are sufficient identified MERs within an acceptable distance from the MER connection sites, power injection requests may be sent to the identified MERs, as indicated at block 136. Whether or not there are sufficient identified MERs within an acceptable distance from the MER connection sites may be determined based on factors such as a total expected or projected available power injection from the identified MERs, an expected or projected discharge request acceptance rate, an expected or projected dispatch capacity for at least some of the MERs, one or more margins or safety factors, any other suitable factor, or any suitable combination of the listed or other factors. As used herein, "dispatch capacity" refers to an MER's ability to provide a power response or injection and may correspond to a magnitude and/or duration of power response or injection available from a particular MER. For example, when an MER is an electric vehicle, the dispatch capacity may refer to the discharge rate and/or duration available from the electric vehicle, which may be a function of the vehicle's current state of charge.

The power injection requests may contain or include a specific assigned connection site for the MER or a list of possible connection sites from which to choose, a power injection start time, and a power injection duration. In some examples, the power injection requests may include details regarding incentive payments that may be available for acceptance of the power injection request and/or financial penalties that might be contractually imposed on certain MERs for non-acceptance of a contractually obligated power injection request.

In some examples, the power injection start time may be calculated or otherwise determined based on, for example, an average distance and/or expected travel time from the MER's current location to the assigned connection site or to the listed possible connection sites. When the MERs are electric vehicles, the power injection start time may be calculated or otherwise determined based on the driving distance and/or an expected drive time to an assigned charging station or to listed possible charging stations.

In some examples, the power injection duration may be estimated based on a predicted outage duration, which may be a function of a predicted fault reparation time.

Confirmation or acceptance signals may be received from participating ones of the MERs, as indicated at block 138. In some examples, the system or system operator may wait for or consider confirmation or acceptance signals that are received during a predetermined period before proceeding. In particular, confirmation or acceptance signals may considered timely, and acted upon, when received during a predefined period of time.

Based on received power request acceptance signals, a determination may be made whether or not the received signals indicate that there will be sufficient MER participation to support restoration of power to the outage area, as indicated at block 140. In particular, an available power injection from the participating ones of the plurality of MERs may be determined. If the available power injection is sufficient to permit restoring service to the outage area, the restoration path may be implemented, such as by executing at least one switching action, to restore service to the outage area using the power injected from the MERs, as indicated at block 142, which may, in some examples, conclude the power restoration.

In some examples, the available power injection may be sufficient to permit restoring service to at least a portion of the outage area. In such an example, the restoration path may be implemented, such as by executing appropriate switching actions, to restore service to the portion of the outage area.

The available power injection may be determined to be sufficient to permit restoring service to the outage area when the available power injection has a magnitude greater than required to supply at least some of the loads in the outage area by at least a predetermined margin. For example, the available power injection may be sufficient to permit restoring service to a portion of the outage area when the available power injection has a magnitude greater than required to supply all of the loads in the portion of the outage area by at least a predetermined margin. In some examples, the available power injection may be sufficient to permit restoring service to the entire outage area when the available power injection has a magnitude greater than required to supply all of the loads in the outage area by at least a predetermined margin.

The predetermined margin over a required power injection may be used to account for the mobile nature of MERs in general, and electric vehicles in particular, along with the possibility that MERs may not arrive at an assigned connection site at the requested power injection start time or may not remain at the connection site for the requested power injection duration. In some examples, the predetermined margin may be set or defined by the system or system operator to account for these possibilities, such as by requiring an available power injection that is a certain percentage over the power injection required to make a desired restoration. Nonexclusive illustrative examples of a suitable margin may include the available power injection being 101%, 105%, 110%, 125%, 150%, or even 200% or more of the power injection required to make a desired restoration. In some examples, the restoration source may adjust its output, such as to ensure that the available power supply during the restoration does not exceed demand, such as where the power injection from the MERs is greater than was expected based on the received acceptance signals.

If the available power injection is determined at block 140 to be not sufficient to permit restoring service to the outage area, the availability of alternative restoration paths may be determined, as indicated at block 144. If there are alternative restoration paths, such as ones that have not already been analyzed, the method may return to block 130 and select another alternative restoration path for consideration.

If there are no remaining alternative restoration available for consideration, the acceptable distance for MER consideration may be increased, as indicated at block 146. Thus, for example, if the power injection available from the plurality of MERs identified within the original acceptable distance is insufficient to permit restoring service to the outage area, such as where the available power injection has a magnitude less than required to supply the loads in the outage area by at least a predetermined margin, the acceptable distance for MER consideration may be increased and a second plurality of mobile energy resources proximate the connection site may be identified, as indicated at block 134, and power injection requests may be sent to the second plurality of mobile energy resources, as indicated at block 136. Given the mobile nature of MERs, it should be understood that the second plurality of mobile energy resources proximate the connection site may be exclusive of, or may include at least some of, the plurality of mobile energy resources that were identified within the original acceptable distance.

As may be understood, increasing the acceptable distance may result in a greater number of MERs being available to provide a power injection. However, the travel time to a connection site may be longer for some of the newly identified MERs. Accordingly, increasing the acceptable distance between connection sites and MERs may require an adjustment to, or increase of, the predetermined margin over the required power injection.

After receiving confirmation or acceptance signals from participating ones of the second plurality of MERs, a second available power injection may be determined for the participating ones of the second plurality of mobile energy resources. If the second available power injection is sufficient to permit restoring service to the outage area, such as by at least a predetermined margin, the restoration path may be implemented. If the second available power injection is not sufficient to permit restoring service to the outage area, such as by at least a predetermined margin, further alternative restoration paths or increases in acceptable distances may be considered, or an indication may be provided that service restoration using MERs may not be available for at least a portion of the outage area.

As may be understood, integration of MERs into an electrical power system service restoration scheme may permit restoring power to more loads within an outage area and/or reduce the likelihood of substation capacity and/or other equipment rating limit violations during restoration of service to outage areas. For example, the inclusion of MERs may allow restoring power to loads in an outage area even when available restoration sources and/or substations otherwise lack the capacity margin needed to perform the restoration. Furthermore, using MERs as part of a method for restoring service within electrical power systems may allow for selective restoration of certain loads, such as more critical loads, within an outage area, which may reduce outage times, improve service quality, and/or improve power system reliability levels. In some examples, the use of MERs may support or allow dynamically adjusted service restoration, which may be based on variations in MER availability and/or load forecasting over various intervals during an outage, such as while the fault is being repaired.

In some examples, the methods and systems disclosed herein may be incorporated into an FDIR algorithm, method or system, which may be used for an electrical power distribution system or network. The FDIR algorithm, method or system may be used in various architectures, such as distribution management system-based (DMS-based), substation-based and/or peer-to-peer-based. In a DMS-based architecture, an FDIR algorithm may be applied at the control center of an electrical power distribution system. In a substation-based architecture, an FDIR algorithm may be applied at a substation level, such as on substation computers. In a peer-to-peer-based architecture, an FDIR algorithm may be applied in a peer-to-peer (P2P) fashion, with various Intelligent Electronic Devices (IEDs) communicating with one another to execute or perform the FDIR algorithm.

An FDIR algorithm may consider or use information regarding the locations of the MERs, the locations of the MER connection sites, and the electrical connections of the MER connection sites to the restoration paths. If a network model is available, such as in DMS-based solutions, the network model and the information from a Geographical Information System (GIS) may be used to extract that information. When a full network model is not available, such as for substation-based or P2P architectures, a simplified connectivity model may be used to determine connection site locations and connectivity to the network. In such examples, the GPS coordinates of the MERs may be received at the FDIR engine and compared with the connection site locations to determine which MERs are proximate the connection sites.

The disclosed methods and systems may be embodied as or take the form of the methods and systems previously described, as well as of a transitory or non-transitory computer readable medium having a plurality of machine- or computer-readable instructions stored thereon that, when executed by a computer processor, carry out operations of the disclosed systems and/or perform the disclosed methods. The computer-readable medium may be any medium that can contain, store, communicate, propagate, or transport the program instruction for use by or in connection with the instruction execution system, apparatus, or device and may, by way of example but without limitation, be an electronic, magnetic, optical, electromagnetic, infrared, or semiconductor system, apparatus, device, or propagation medium or other suitable medium upon which the program is recorded. More specific examples (a non-exhaustive list) of such a computer-readable medium may include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the disclosed methods and systems may be written in any suitable programming language provided it allows achieving the previously described technical results. The instructions may be configured for execution on any device having sufficient processing power and access to the required data.

As used herein the term "configured" should be interpreted to mean that the identified elements, components, or other subject matter are selected, created, implemented, utilized, designed, modified, adjusted and/or intended to perform the indicated action and/or to perform, operate, behave and/or react in the indicated manner.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, recitation in the disclosure and/or the claims of "a" or "a first" element, or the equivalent thereof, should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A method for restoring service within an electrical power system, the method comprising:

identifying a restoration path for an outage area within the electrical power system;

selecting a mobile energy resource connection site that is electrically connected to at least one of the restoration path and the outage area;

sending power injection requests to a first plurality of mobile energy resources, at least some of which are proximate the mobile energy resource connection site, the power injection requests comprising requests for the first plurality of mobile energy resources to inject power;

receiving power injection acceptances from participating ones of the first plurality of mobile energy resources;

determining a first available power injection from the participating ones of the first plurality of mobile energy resources;

implementing the restoration path to inject power from one or more of the first plurality of mobile energy resources to the restoration path when the first available power injection has a magnitude greater than required to permit restoring service to at least a portion of the outage area, wherein the restoration path includes a portion of a distribution feeder of a utility power grid;

sending power injection requests to a second plurality of mobile energy resources proximate the connection site when the first available power injection has a magnitude less than required to permit restoring service to the portion of the outage area;

receiving power injection acceptances from participating ones of the second plurality of mobile energy resources;

determining a second available power injection from participating ones of the first and second pluralities of mobile energy resources; and implementing the restoration path when the second available power injection has a magnitude greater than required-to permit restoring service to the portion of the outage area.

2. The method of claim 1, wherein the power injection requests direct the mobile energy resources to inject power at the connection site.

3. The method of claim 1, wherein implementing the restoration path comprises executing at least one switching action.

4. The method of claim 1, wherein the first available power injection has a magnitude greater than required to supply at least some loads in the outage area by at least a predetermined margin.

5. The method of claim 1, wherein the plurality of mobile energy resources are vehicles comprising electrical energy sources and the connection site is configured to selectively exchange power with the plurality of electrical energy source.

6. The method of claim 5, wherein at least some of the plurality of mobile energy resources are plug-in electric vehicles and the connection site is a charging station configured for use with the plug-in electric vehicles.

7. The method of claim 1, comprising:

isolating a fault in the electrical power system and creating the outage area; and identifying a restoration source for the outage area.

8. The method of claim 1 embodied as a plurality of machine-readable instructions on a computer readable storage medium, wherein the plurality of machine-readable instructions are configured to be executed by at least one computer processor to perform the method.

9. The method of claim 1, wherein the first mobile energy resources are proximate the connection site when the first mobile energy resources are within an acceptable distance defined for the connection site.

10. A method for restoring service within an electrical power system including a utility grid electrical power line dividable into a plurality of portions, the method comprising:

identifying a restoration path for an outage area within the electrical power system;

selecting an electric vehicle charging station electrically connected to at least one of the restoration path and the outage area;

sending discharge requests to a first plurality of electric vehicles, at least some of which are proximate the electric vehicle charging station, the discharge requests including request for the first plurality of vehicles to discharge power;

receiving discharge acceptances from participating ones of the first plurality of electric vehicles;

determining a first available power injection from the participating ones of the first plurality of electric vehicles;

implementing the restoration path including executing at least one switching action to implement the restoration path when the first available power injection has a magnitude greater than required to supply power to-at least a portion of the outage area, wherein the restoration path includes a portion of the utility grid electrical power line receiving injected power and an act of implementing the restoration path includes actuating one or more of a plurality of switches to select the portion of the utility grid electrical power line receiving injected power;

identifying a second plurality of electric vehicles proximate the electric vehicle charging station when the first available power injection has a magnitude less than required to permit restoring service to at least the portion of the outage area;

sending discharge requests to the second plurality of electric vehicles;

receiving discharge acceptances from participating ones of the second plurality of electric vehicles;

determining a second available power injection from participating ones of the first and second pluralities of electric vehicles; and implementing the restoration path when the second available power injection has a magnitude greater than required to permit restoring service to at least the portion of the outage area.

11. The method of claim 10, comprising identifying the first plurality of electric vehicles as being proximate the electric vehicle charging station.

12. The method of claim 10, wherein the discharge requests comprise instructions to proceed to the electric vehicle charging station and inject power into the electric power system.

13. The method of claim 10, wherein the portion of the outage area includes at least one load, and the available power injection has a magnitude greater than required to supply the at least one load by at least a predetermined margin.

14. The method of claim 10, wherein at least some of the plurality of electric vehicles are plug-in electric vehicles and the charging station is configured to selectively receive power from the plug-in electric vehicles.

15. The method of claim 10, comprising:

creating the outage area by isolating a fault in the electrical power system; and identifying a restoration source for the outage area.

16. The method of claim 10, wherein the first plurality of electric vehicles are proximate the electric vehicle charging station when the first plurality of electric vehicles are within a predefined expected travel distance from the electric vehicle charging station.

17. A system for restoring service within an electrical power system including a distribution feeder, the system comprising:

a processor; and a non-transitory computer readable storage medium having a plurality of machine-readable instructions embodied thereon and configured for execution by the processor, the plurality of machine-readable instructions comprising a set of instructions to:

identify a restoration path for an outage area within the electrical power system;

select an electric vehicle charging station electrically connected to at least one of the restoration path and the outage area;

send power injection requests to a first plurality of electric vehicles, at least some of which are proximate the electric vehicle charging station, the power injection requests comprising requests for injection of power from the first plurality of electric vehicles;

receive power injection acceptances from participating ones of the first plurality of electric vehicles;

determine a first available power injection from the participating ones of the first plurality of electric vehicles;

implement the restoration path when the first available power injection has a magnitude greater than required to supply at least one load in the outage area by at least a predetermined margin, wherein the restoration path includes the electric vehicle charging station coupled to a first point of the distribution feeder outside of the outage area and a portion of the distribution feeder between the first point and the outage area;

identify a second plurality of electric vehicles proximate the electric vehicle charging station when the first available power injection has a magnitude less than required to supply the at least one load in the outage area by at least a predetermined margin;

send power injection requests to the second plurality of electric vehicles, the power injection requests comprising requests for injection of power by the vehicles;

receive power injection acceptances from participating ones of the second plurality of electric vehicles;

determine a second available power injection from participating ones of the first and second pluralities of electric vehicles; and implement the restoration path when the second available power injection has a magnitude greater than required to supply the at least one load in the outage area by at least the predetermined margin.

* * * * *